United States Patent [19]

Morgan et al.

[11] Patent Number: 6,060,167

[45] Date of Patent: May 9, 2000

[54] NON-CHALKING RELEASE/WEAR COATING

[75] Inventors: Richard Alan Morgan, Vienna, W. Va.; Luc Germain Pierre Joseph D'Haenens, Yokohama, Japan

[73] Assignee: E. I. du Pont de Nemours and Company, Wilmington, Del.

[21] Appl. No.: 09/027,085

[22] Filed: Feb. 20, 1998

Related U.S. Application Data

[63] Continuation of application No. 08/395,541, Feb. 28, 1995, abandoned, which is a continuation-in-part of application No. 08/204,933, Mar. 2, 1994, abandoned.

[51] Int. Cl.$^7$ ........................... B32B 15/08; B32B 27/06; B32B 27/32

[52] U.S. Cl. ........................... 428/422; 428/421; 428/457; 526/242; 526/250; 526/255; 524/155; 524/284; 524/300; 524/356; 524/379

[58] Field of Search ..................................... 428/421, 422; 526/242, 250, 255; 524/155, 284, 300, 356, 379

[56] References Cited

U.S. PATENT DOCUMENTS

| | | | |
|---|---|---|---|
| 3,635,926 | 1/1972 | Gresham et al. | 260/87.5 A |
| 3,956,000 | 5/1976 | Kuhls et al. | 106/270 |
| 4,134,995 | 1/1979 | Fumoto et al. | 260/884 |
| 4,380,618 | 4/1983 | Khan et al. | 526/206 |
| 4,530,981 | 7/1985 | Malhotra | 526/73 |
| 4,564,652 | 1/1986 | Shimizu et al. | 524/805 |
| 4,621,116 | 11/1986 | Morgan | 524/746 |

*Primary Examiner*—Vivian Chen

[57] ABSTRACT

A release coating of thermally stable essentially non-fluorocarbon polymer and low molecular weight fluorocarbon polymer is made non-chalking; i.e., not cause waxy buildup on fabrication equipment producing articles having the coating thereon, by a special polymerization process for making the fluorocarbon polymer, viz., aqueous dispersion polymerization using conventional initiator, dispersing agent, and chain transfer agent, but also having carboxylic acid, salt, ester or peroxide thereof, or alkanol or ester thereof or ketone present during the polymerization. Alternatively, the additive can be fluorosurfactant which contains carbon-hydrogen bonding and which also serves as the dispersing agent in the polymerization medium.

20 Claims, No Drawings

NON-CHALKING RELEASE/WEAR COATING

CONTINUATION INFORMATION

This application is a continuation of U.S. patent application Ser. No. 08/395,541 filed Feb. 28, 1995, now abandoned, which is a continuation-in-part of U.S. patent application Ser. No. 08/204,933 filed Mar. 2, 1994, now abandoned, by the same inventors.

FIELD OF THE INVENTION

This invention relates to release coatings which contain low molecular weight fluorocarbon polymer and thermally stable, high melting, essentially non-fluorocarbon polymer.

BACKGROUND OF THE INVENTION

U.S. Pat. No. 3,956,000 discloses the preparation of low molecular weight fluorocarbon polymer, referred to as wax in the patent, by direct polymerization, including copolymerization, of one or more monomers, at least one of which is a fluorocarbon monomer. Because the polymerization is carried to low molecular weight in the presence of a chain transfer agent, the polymerization is called telomerization. The low molecular weight fluorocarbon polymer is made in an aqueous dispersion polymerization system using initiators and emulsifiers known and generally used for homopolymerization of tetrafluoroethylene in aqueous dispersion. The initiators disclosed are those consisting of a plurality of compounds to form a redox system, notably ammonium persulfate/sodium bisulfite such as used in the telomerization process of the Examples of the patent. The low molecular weight polymer is then isolated from the dispersion and obtained as a powder.

A principal utility of directly polymerized low molecular weight fluorocarbon polymer such as described above is in combination with thermally stable, high melting essentially non-fluorocarbon polymer to form a coating composition from a liquid medium onto the surface of clean metal sheet typically supplied in the form of a roll or coil thereof. The coating is dried and then baked to fuse the coating, wherein the non-fluorocarbon polymer forms a wear surface on the surface of the metal sheet, and the fluorocarbon polymer provides release properties to the coating, making articles fabricated from the sheet useful in such applications as bakeware. This fabrication normally is carried out by stamping out shapes from the sheet, followed by forming these shapes into the article desired, such as by bending and/or folding. Unfortunately, the rigorous treatment of the coated sheet to obtain the desired fabricated articles therefrom causes a waxy buildup on the fabrication equipment, which comes from the coating on the metal sheet. Periodically, the fabrication operation must be stopped for cleaning of the fabrication equipment to remove the waxy buildup.

SUMMARY OF THE INVENTION

It has been determined that the waxy buildup on the aforesaid fabrication equipment is low molecular weight fluorocarbon polymer coming primarily from the surface of the coating. The determination that the polymer is from the surface of the coating has been made by subjecting the surface to application and removal of a particular adhesive tape in accordance with the procedure to be described hereinafter. If the imprint of the tape is visible to the naked eye on the surface of the coating, the coating can be described as having the attribute of chalking. If the imprint of the tape is not visible in the coating, the coating is non-chalking. Chalking therefore means that a slight portion of the coating surface is removed by adhesion of the tape. The fact that the tape has removed only a slight portion of the coating surface is evident from the feel of the surface; i.e., no indentation in the surface corresponding to the tape imprint is detectable to the touch. Prior to this tape test for chalking, the coating is smooth and glossy; chalking does not mean that the coating has a hazy appearance or a powder coating thereon. The imprint of the tape, if discernible after removal of the tape, has the appearance of diminished gloss as compared to the remainder of the coating. The consequence of this tape test result is visible in the fabrication process on the coated sheet. If the coating is non-chalking by the tape test, there is essentially no waxy buildup on the fabrication equipment. If the coating chalks, there is waxy buildup on the fabrication equipment.

The present invention provides a release coating on a substrate, comprising high melting essentially non-fluorocarbon polymer and low molecular weight fluorocarbon polymer, wherein the fluorocarbon polymer is made by a special polymerization process which renders the coating essentially non-chalking. Thus the present invention also provides an improved coated article fabrication process wherein the waxy buildup on fabrication equipment is essentially prevented by using the improved release coating of this invention.

The special polymerization process is conventional in the sense of being carried out in an aqueous medium containing as the essential ingredients monomer, initiator, dispersing agent and chain transfer agent to obtain the low molecular weight desired. The special aspect of the process resides in the discovery of the present invention that when the polymerization is carried out in the presence of an effective amount of one or more additives selected from the group consisting of:

(i) hydrocarbon carboxylic acid, and salts, esters and peroxides thereof, (ii) hydrocarbon sulfonic acid, and salts and esters thereof, (iii) alkanol and esters thereof, and (iv) ketones, these additives essentially prevent chalking from occurring when the resultant low molecular weight fluorocarbon polymer is incorporated into the release coating.

Surprisingly, when the low molecular weight fluorocarbon polymer is made via this modification of the polymerization process and then blended with the essentially non-fluorocarbon polymer to form a release coating, the coating essentially does not chalk.

The present invention also provides the coating composition for achieving the improved result of non-chalking.

In another embodiment of the present invention, the dispersing agent is a special fluoro-surfactant which also contains C-H bonding, and this surfactant can function as alternative additive (v) or in addition to additives (i) to (iv) mentioned above.

Each of the additives (i)–(v), has some chain transfer activity, but with poor efficiency, such that the additive has only a very small effect on molecular weight as compared to that achieved with the normally used chain transfer agent by itself. Thus, the polymerization aspect of the present invention involves the use of a combination of chain transfer agents, the relatively strong or primary non-polar chain transfer agent which is normally used for obtaining reduced melt viscosity polymer, together with the additive described above as a secondary chain transfer agent.

Strong chain transfer agents, such as alkane are considered non-polar and, thus, have only partial solubility in the aqueous polymerization medium. The additives described above are polar and, thus, are soluble in the aqueous polymerization medium. By some mechanism, the combination of polar and non-polar chain transfer agents in effect used in the polymerization of the present invention not only produces the low melt viscosity polymer desired, e.g., no greater than $1 \times 10^5$ Pa·s at 372° C., but solves the chalking problem.

When the additive used is additive (v), the combination of ingredients present is of relatively strong chain transfer agent and fluorosurfactant which contains carbon-hydrogen bonding, which serves both as the dispersing agent and a water soluble relatively weak chain transfer agent.

The present invention further provides the special polymerization process described above wherein the additive is the fluorosurfactant which contains carbon-hydrogen bonding, providing relatively weak chain transfer activity, along with non-polar chain transfer agent, and the low melt viscosity tetrafluoroethylene polymer obtained thereby. Such polymer can contain up to 0.5 mol % of other copolymerized monomer, and the melt viscosity of this tetrafluoroethylene polymer is from 50 Pa·s to $1 \times 10^5$ Pa·s at 372° C.

DETAILED DESCRIPTION

Preferred low molecular weight fluorocarbon polymers made in accordance with the present invention are the tetrafluoroethylene polymers, examples of which are polytetrafluoroethylene homopolymer and copolymers of tetrafluoroethylene with one or more fluorinated, preferably perfluorinated monomers, such as olefins having from 3 to 6 carbon atoms, such as hexafluoropropylene, and perfluoro (alkyl vinyl ether) wherein the alkyl group contains 1 to 5 carbon atoms. If comonomer is present in the tetrafluoroethylene polymer, the amount may be relatively small; e.g., less than about 0.5 mol % of comonomer, to provide improvement in the film forming property of the eventual coating. The low molecular weight fluorocarbon polymer will generally have a melting (peak) temperature of at least 315° C. and often at least 320° C. as measured by ASTM D4591-87.

The aqueous dispersion polymerization of the monomer (s) corresponding to the polymer desired is conventional with regard to its being carried out in an aqueous dispersion system containing the monomer, emulsifying agent (surfactant), such as ammonium perfluorocarboxylate; e.g., ammonium perfluorocaprylate, and non-polar chain transfer agent, such as hydrogen or an aliphatic hydrocarbon or halocarbon having 1 to 20 carbon atoms, usually 1 to 8 carbon atoms, e.g., alkane such as ethane, or chloroform, at temperatures such as 40° C. to 100° C. and pressures such as 1.5 to 3.4 MPa. It is not conventional to replace the perfluorosurfactant in this system by fluorosurfactant which contains carbon-hydrogen bonding, this being one embodiment of the present invention as explained above. The initiator is a conventional free radical initiator such as organic persulfates, e.g. ammonium persulfate, inorganic persulfates, e.g. potassium persulfate, or potassium permanganate used in a conventional amount. The chain transfer agent will normally be added prior to the start of the polymerization reaction, and the initiator will normally be added both to start the polymerization reaction and during its progress.

In addition to the initiator and in accordance with the present invention, the additives (i), (ii), (iii), (iv) and/or (v) are also present in the polymerization medium during the polymerization reaction. The additives (i), (ii) (iii) and/or (iv) used in this invention may be all added at the beginning of the polymerization or may be added in stages, or be added continuously throughout the polymerization. It is preferred that most of the additive is added at the beginning of the polymerization. When the additive is the fluorosurfactant which contains carbon-hydrogen bonding (additive (v)), this is used in place of the conventional perfluorosurfactant, and is preferably added all at the beginning of the polymerization reaction. Preferably, additives (i)–(v) are polar, which is in contrast to the non-polarity of the primary chain transfer agent. By "polar", it is meant that the additives have relatively high dielectric constant values. Dielectric constant values are typically the highest for aliphatic compounds which can hydrogen bond. Such materials also typically have greater water solubility than non-polar materials, e.g., the water solubility can be characterized by at least 1 wt % of the additive being soluble in water at 20° C.

The polar additives are aliphatic and contain carbon-hydrogen bonds but may also contain carbon-halogen bonds. The aliphatic moiety of the additives can have a short or long chain length depending on polarizability but will typically contain 1–20 carbons, preferably 1–14 carbons. The chains may also contain ether linkages and one or more acid or alcohol groups in the case of additives (i), (ii), (iii) and (iv). The aliphatic moiety of the fluorosurfactant will have a portion which is fluorinated and a portion which is hydrogen-substituted onto the carbon atom(s).

Examples of the additives are the alkylene carboxylic acids wherein the alkylene group has from 3 to 6 carbon atoms. Specific examples of additives include propionic, malonic, succinic, adipic, citric, acetic, glutaric, formic, and hydroxyacetic acids and the salts, esters or peroxides thereof, preferably dissuccinic acid peroxide, which itself is a polymerization initiator but much less active than persulfate or permanganate. The peroxides can be either the combination of two acid groups, forming —$CO_2O_2C$—, or the per-acid, $CO_3H$. Additional examples include methanol, and ethanol as preferred straight-chain alcohols, and isopropanol, t-butanol, 2,4-dimethyl-3-pentanol, acetone, methyl ethyl ketone, and ethyl sulfonic acid. Esters of water soluble alcohols and acids may also be used. Examples of salts include the alkali and alkaline earth metal salts such as the Na, K, and Ca salts of the carboxylic and sulfonic acids. Examples of fluorosurfactants which contain carbon-hydrogen bonding include the perfluoroalkylalkane sulfonic acids, wherein the alkyl group contains from 5 to 20 carbon atoms and the alkane group, containing 1 to 4 carbon atoms, provides the presence of carbon-hydrogen bonding. A preferred such fluorosurfactant is available as Zonyl® TBS fluorosurfactant (DuPont Company), which is a mixture of $C_6$ to $C_{16}$ perfluoroalkylethane sulfonic acids.

The use of additive (i) is disclosed in U.S. Pat. Nos. 4,342,675 and 4,186,121, respectively, for the purpose of reducing coagulum formation during the aqueous dispersion polymerization process of high molecular weight tetrafluoroethylene polymer. In the '121 patent it is disclosed that the carboxylic acid is non-telogenic and in the '121 and '675 patents it is disclosed that the dispersing agent is non-telogenic; this is because high molecular weight tetrafluoroethylene polymer is being made in these patents. All of the polar additives used in the present invention can have some telogenic activity.

The amount of the additive (i), (ii), (iii), (iv) or (v) used to be effective in essentially preventing the chalking problem from arising later in use will depend on the particular additive used, but generally the amount will be from 4 to 50 times the amount of initiator other than acid peroxide (additive (i)) used. Of course, when the additive is (v), the amount used will also be effective to disperse the polymer as it is formed in the aqueous polymerization medium.

The polymerization is carried out until the desired low molecular weight is obtained, as indicated by the relatively low melt viscosity of the polymer; e.g., 50 to $1 \times 10^5$ Pa·s, preferably 100 to $1 \times 10^4$ Pa·s. Additional preferred melt viscosity ranges are $5 \times 10^2$ to $5 \times 10^4$ Pa·s ($5 \times 10^3$ to $5 \times 10^5$ poises), preferably 1 to $5 \times 10^3$ Pa·s, and the range of 1.2 to $4.0 \times 10^3$ Pa·s. All melt viscosities are measured at 372° C. by the procedure described in ASTM D-1239-52T modified as disclosed in U.S. Pat. No. 5,168,107. These melt viscosities can be compared with that of typical tetrafluoroethylene polymer which may contain up to 0.5 mol % of other fluorinated comonomer, which exceeds $10^{10}$ Pa·s. The dispersed low molecular fluorocarbon polymer is then recovered from the aqueous medium by coagulation and drying, to obtain a powder of the polymer. This low molecular weight fluorocarbon polymer is directly polymerized to this low molecular weight as distinguished from tetrafluoroethylene polymer "micropowder" that has been available from radiation degradation of high molecular weight polymer.

This powder is then blended with the thermally stable essentially non-fluorocarbon polymer, which polymer is fusible and typically has a sustained use temperature of at least 140° C. Examples of such polymers include one or more of the polysulfones, which are amorphous thermoplastic polymers with a glass transition temperature of about 185° C. and a sustained service temperature of about 140° C. to 160° C., polyethersulfones, which are amorphous thermoplastic polymers with a glass transition temperature of about 230° C. and a sustained service temperature of about 170° C. to 190° C., polyphenylene sulfides, which are partially crystalline polymers with a melting temperature of about 280° C. and a sustained service temperature of about 200° C. to 240° C., and polyamide imides, which crosslink upon heating of the coating to fuse it and which have a sustained service temperature in excess of 250° C. All of these polymers are thermally stable and dimensionally stable at temperatures within their sustained service range and below, and they are wear resistant. They also adhere well to clean metal surfaces.

Any method of blending can be used which achieves an intimate mixture of the two polymers. Typically an organic liquid will be used as the blending medium and the essentially non-fluorocarbon polymer may dissolve in the particular liquid (solvent) chosen. If not dissolved, the non-fluorocarbon polymer should be finely divided, which may require the polymer to be milled either before or during the blending. The resultant coating composition will have the low molecular weight fluorocarbon polymer particles dispersed in the liquid medium and the non-fluorocarbon polymer either dispersed in the medium as finely divided particles or dissolved in the liquid medium to give the intimate mixture of the polymers desired.

The organic liquid used will depend on the identity of the non-fluorocarbon polymer and whether a solution or dispersion thereof is desired. Examples of such liquids are such high boiling solvents as N-methylpyrrolidone, butyrolactone, and high boiling aromatic solvents and alcohols and the amount used will depend on the flow characteristics desired for the particular coating operation.

The proportion of the polymer components in the coating composition and the resultant coating will generally be from 1:9 to 9:1 parts by weight with respect to the essentially non-fluorocarbon polymer and the low molecular weight fluorocarbon polymer and preferably 3:7 to 7:3 parts by weight, these being the essential polymer components of the composition for providing both release and wear characteristics to the substrate being coated.

The coating composition and the resultant coating can also contain other ingredients such as commonly present in such coatings prior to the present invention. Examples of such other ingredients include finely divided filler and/or pigment to provide hardness and color, respectively, to the coating. These ingredients can be blended into the composition during the blending of the polymers with one another.

The coating composition can be applied to a wide variety of substrates which have sufficient thermal stability to permit heating of the coating to fuse it to a non-porous release coating. Typically, such substrates will be of metal such as aluminum or steel. The application of the coating can be done by conventional processes, especially those used to coat metal sheet supplied from a coil, followed by heating the coating to fuse it and drive off any liquid carrier that might be present. For example, the coating composition can be flowed, sprayed, dipped, roll coated, or otherwise applied onto the substrate surface. The metal sheet need only be clean such as by degreasing; i.e., no primer coat is necessary, for the fused coating to have sufficient adherence to withstand fabrication of stampings of the metal sheet into articles. The resultant (dried, fused) coating on the substrate such as the metal coil will generally be from 6 to 20 $\mu$ (micrometers) thick, while other coating applications will use coating thicknesses of 3 to 30 $\mu$. The resultant coating then provides a release surface to the article fabricated from the substrate, with the non-fluorocarbon polymer providing wear resistance to the coating. The non-chalking coating of the present invention is exposed; i.e., not covered up by another coating. This is in contrast to the primer coating which contains directly polymerized somewhat higher molecular weight perfluorocarbon resin disclosed in U.S. Pat. No. 5,168,107, wherein the primer coating is then overcoated with one or more intermediate and/or topcoats. While primer coating of the substrate and/or topcoats are generally unnecessary for use in combination with coatings of the present invention, such additional coatings can be used where desired.

The release coating of the present invention made using directly polymerized low melt viscosity fluorocarbon polymer as hereinbefore described is essentially non-chalking. In addition to being useful as a release coating for bakeware, the improved coating of the present invention can be used for other release/wear applications on such articles as ovenware, hotplates, oil pots, deep fryers, sole-plates of steam irons, and oven-top plates.

EXAMPLES

In the Examples, "parts" and percents are on a weight basis unless otherwise indicated.

Example 1

Polymerizations (a) A cylindrical, horizontally disposed, waterjacketed, stirred, stainless steel reactor having a length to diameter ratio of about 1:5, a 4-bladed cage-type agitator running the length of the reactor, and a water capacity of about 80 parts was charged with 49 parts of demineralized water and 0.022 part of ammonium perfluorocaprylate dispersing agent. The reactor was pressure tested at 2.8 MPa and 90° C. while stirring the reactor contents at 46 rpm. The reactor was then cooled to reduce the temperature of its contents below 30° C. The reactor was then evacuated and purged three times with tetrafluoroethylene (TFE) monomer, leaving a reduced pressure on the reactor after the final evacuation. A valve was then opened to slowly release ethane into the reactor until the pressure was raised by 0.08 MPa. The valve was then closed and the reactor temperature was raised to 90° C. with the agitator running at 46 rpm. After the temperature reached 90° C., the reactor was pressurized with TFE to a pressure of 2.6 MPa. A freshly prepared solution (1.8 parts) of 0.3 wt % ammonium persulfate (APS) and 1.3 wt % disuccinic acid peroxide (DSP) in demineralized water was pumped into the reactor at a rate of 0.20 parts/minute to initiate polymerization. After polymerization began (0.07 MPa drop in reactor pressure), additional TFE was added to the reactor at a rate so as to maintain the pressure at 2.6 MPa. After 3 parts of TFE had been added to the reactor after kickoff, 2.0 parts of a 2.7% solution of ammonium perfluorocaprylate in demineralized water was pumped into the reactor at a rate of 0.2 part/minute. After 15 parts TFE addition, 0.66 part of a solution of APS (0.07%), and DSP (0.7%) in demineralized water were pumped into the reactor at a rate of 0.11 part/minute. When 22 parts of TFE had been added to the reactor, the TFE feed was stopped but the reaction was continued until the reactor pressure dropped to 1.3 MPa. The reactor was then vented and the product dispersion was removed. The dispersion contained about 33% polymer by weight. The dispersion was cooled, diluted to 13.7 wt % solids with demineralized water and 1.6 wt % ammonium carbonate (based on polymer) was added. The dispersion was coagulated at a temperature of 26° C. to 30° C. by the application of vigorous stirring. The resulting powder was collected on a filter and then dried at 150° C. for three days.

The melt viscosity of the dried resin was measured at 372° C. by the procedure described in ASTM D-1238-52T modified by (1) using a cylinder, orifice, and piston tip made of a corrosion-resistant alloy, Haynes Stellite® 19, (2) charging a 5.0 g sample to the 9.53 mm ID cylinder, and (3) five minutes after charging, the sample is extruded through a 2.10 mm diameter, 8.00 mm long square-edged orifice under a load of 5000 g. The melt viscosity in poise was calculated as 36,910 divided by the observed extrusion rate expressed in grams per minute. The melt viscosity of this dried powder was $1.0 \times 10^4$ poise ($10^3$ Pa·s).

(b) For comparison purposes, the above procedure was essentially repeated except that no DSP was used, and the first and second additions of APS had solution concentrations of 0.25 wt % and 0.09 wt %, respectively. The resultant low molecular weight PTFE had a melt viscosity of $1.5 \times 10^3$ Pa·s.

(c) The procedure of section (a) was essentially repeated to make TFE/HFP copolymer, with the following changes in such procedure: The demineralized water charge to the reactor was 50 parts. The amount of the first initiator solution was 1.1 parts and the solution contained 0.12 wt % APS and 1.5 wt % DSP. After the valve was closed, 0.10 parts of hexafluoropropylene (HFP) was pumped into the reactor and then the temperature was raised to 90° C. The second addition of ammonium perfluorocaprylate to the reactor was 1.8 parts of a 3.1 wt % solution thereof. The second initiator solution contained 0.05 wt % APS and 0.5 wt % DSP. The polymerization produced an aqueous dispersion containing 33% solids. The dispersion was diluted with demineralized water to a solids content of 16.5%, 3.0% (based on polymer weight) ammonium carbonate was added, and it was coagulated by the application of vigorous stirring. The resulting powder, after drying, contained 0.01 mole % HFP and had a melt viscosity of $3.5 \times 10^3$ Pa·s.

(d) The procedure of paragraph (c) was essentially repeated except as follows: The first initiator solution was 1.1 parts and the solution contained 0.17 wt % APS and 2.1 wt % DSP. HFP in the amount 0.23 part was added. The second addition of ammonium perfluorocaprylate was 1.1 parts of 5 wt % solution thereof and its pumping rate into the reactor was 0.2 part per minute. The second addition of initiator was 0.66 part of a solution containing 0.07 wt % APS and 0.7 wt % DSP. Polymerization produced an aqueous dispersion with a solids content of 32%. The dispersion was diluted with demineralized water to a solids content of 15.8%, 2.1% (based on polymer weight) ammonium carbonate was added, and it was coagulated by the application of vigorous stirring. The resulting powder, after drying, contained 0.025 mole % HFP and had a melt viscosity of $1.4 \times 10^3$ Pa·s.

(e) Example 1a was repeated except that
1) after evacuation 0.13 part of chloroform chain transfer agent was introduced into reactor instead of ethane,
2) first initiator solution was 1.7 parts containing 0.13% APS and 1.7% DSP,
3) after 3 lbs. of TFE addition, 0.9 part of a 6.2% ammonium perfluorocaprylate solution was added to reactor at 0.04 parts/minute,
4) after 15 lbs. of TFE addition after kickoff, the second initiator was 0.4 part of a solution containing 0.13% APS and 1.3% DSP.

The product dispersion contained 33% polymer. It was diluted to 13.5% solids, 1.6% ammonium carbonate was added, and the mixture was coagulated by vigorous stirring at 26° C. to 30° C. After drying at 150° C., the powder had a melt viscosity of $3.6 \times 10^3$ Pa·s.

Example 2

Coating Preparation and Testing (a) The coating composition was prepared by mixing together by milling the non-fluorocarbon polymer, low molecular weight fluorocarbon polymer prepared as in Example 1, and organic liquid in the same way as though the fluorocarbon polymer was prepared without the DSP additive, using the following ingredients and proportions:

|  | Parts by Weight |
| --- | --- |
| polyethersulfone | 160 |
| N-methyl-pyrrolidone | 480 |
| diacetone alcohol | 252 |
| fluorocarbon polymer of Ex. 1 | 252 |
|  | 1000 |

The polyethersulfone can be obtained from such sources as ICI (Victrex® 4100P), BASF (Ultrason® E), or Amoco (Radel® A) polyethersulfone resin. This polymer was dissolved in the pyrrolidone solvent, and the alcohol cosolvent aided in the eventual removal of the pyrrolidone solvent.

Into 100 parts by weight of the above composition were blended 20 parts by weight of white $TiO_2$ pigment millbase and 3 parts by weight of carbon black millbase. Viscosity was reduced by adding additional pyrrolidone solvent and the resultant coating composition was applied to clean (degreased) aluminum panels using an automatic meter bar coater to simulate coil coating. The resultant coating was dried at 220° C. to remove most of the solvent, followed by baking (fusing) for 5 min. at 400° C. to give a coating thickness of 12 μ.

This procedure was carried out on each of the fluorocarbon polymers prepared in Example 1 and the resultant coatings were tested by the tape test. (Scotch® Brand Tape No. 600, by 3M Company.) Prior to the tape test, all of the coatings were smooth and glossy, with the coating made from Example 1 (b) polymer having the highest gloss. In the tape test, the tape used was pressure sensitive cellulose adhesive tape, 13 mm wide, the tape was applied to the coating surface and removed, all in accordance with ASTM D4214-89, followed by visual inspection for any imprint of the tape on the coating.

The coating from polymer of Example 1 (b) exhibited a clear imprint of the tape on the coating surface and coating of this composition has been observed to produce waxy buildup on coated metal coil fabrication equipment. The coating from polymer of Example 1 (a) exhibited no tape imprint, and this coating has been observed not to cause waxy buildup in such fabrication equipment. The coatings using polymer from Examples 1 (d) and (e) also exhibited no tape imprint, while the coating from the polymer of Example 1 (c) exhibited a barely visible imprint, i.e. essentially non-chalking which would nevertheless be expected to perform substantially better in fabrication equipment than the coating made using the polymer Example 1 (b).

(b) The following composition was ground to form a mill-base:

|  | Parts by Weight |
| --- | --- |
| ethylene glycol | 330 |
| ethylene glycol monobutyl ether | 280 |
| Triton ® X 100 non-ionic surfactant | 34 |
| polyphenylene sulfide (Ryton ® VI) | 236 |
| BaSO$_4$ | 120 |
|  | 1000 |

To 200 parts of this mill-base was added 20 parts of the fluorocarbon polymer of either Ex. 1 (a) or (b), 12 parts ethylene glycol, and 15 parts ethylene glycol monobutyl ether. The resultant composition was blended together by milling. Into 100 parts by weight of this composition was blended by mixing 2 parts by weight of carbon black mill-base. The resultant coating composition was coated onto degreased aluminum panel as in Ex. 2 (b) above, followed by drying at 100° C. for 15 minutes and baking for 5 minutes at 400° C. to fuse the coating. The coating made using the fluorocarbon polymer of Ex. 1 (a) passed the tape test (no tape imprint visible on the coating) while the coating made using the fluorocarbon polymer of Ex. 1 (b) failed the tape test (tape imprint visible).

Example 3

A polymerization was carried out identically to Example 1 except that the first APS/DSP solution which was pumped into that polymerization was replaced with a solution of APS (0.25 wt %) and glutaric acid (1.25 wt %) in demineralized water and the second APS/DSP solution pumped was replaced with a solution of APS (0.09 wt %) and glutaric acid (0.45 wt %) in demineralized water. A portion of resin from the resulting dispersion was isolated and dried in the same manner as that described for Example 1. This resin had a melt viscosity of $2.4 \times 10^4$ poise ($2.4 \times 10^3$ Pa·s). The resin was incorporated into a release coating and tested for chalking in accordance with the procedure of Example 2, and the coating passed the tape test.

Example 4

A separate polymerization was carried out similar to Example 1 except that the pressure rise achieved by ethane addition was 0.07 MPa and the first pumped solution contained 0.23 wt % APS and 1.15 wt % methanol and the second pumped solution contained 0.09 wt % APS and 0.43 wt % methanol. A portion of resin from the resulting dispersion was isolated and dried in the same manner as that described for Example 1. This resin had a melt viscosity of $1.4 \times 10^4$ poise ($1.4 \times 10^3$ Pa·s). The resin was incorporated into a release coating and tested for chalking in accordance with the procedure of Example 2, and the coating passed the tape test.

Example 5

A similar reactor to that used for the previous examples but having a water capacity of 1210 parts was charged with 696 parts of demineralized water and 26 parts of a 5.2 wt % aqueous solution of Zonyl® TBS fluorosurfactant. The agitator was turned on at 19 rpm and the reactor temperature was set at 30° C. The reactor was then evacuated and purged three times with TFE monomer finally leaving a reduced pressure on the reactor. A valve was then opened releasing ethane into the reactor until the reactor pressure was raised by 0.12 MPa. The valve was then closed and the reactor temperature was raised to 90° C. with the agitator running at 19 rpm. After the temperature reached 90° C., the reactor was pressurized with TFE to a pressure of 2.1 MPa. A freshly prepared solution (19 parts) of a 0.10 wt % APS solution in demineralized water was pumped into the reactor at a rate of 3.0 parts/minute which initiated polymerization. Thereafter for the remainder of the polymerization, a solution of 1.16 wt % APS in demineralized water was pumped into the reactor at 0.21 part/minute. Additional TFE monomer was added to the reactor at a rate so as to maintain the reactor pressure at 2.1 MPa. A total of 315 parts of TFE was added over a time of 160 minutes. The agitator speed was slowly increased to 23 rpm over the time of the reaction. After 315 parts of TFE had been added, TFE addition was stopped but agitation and initiator addition were continued until the pressure dropped to 0.4 MPa. The reactor was then vented and the dispersion was removed from the reactor. The dispersion contained about 31% polymer by weight. A portion of the dispersion was then diluted to about 16 wt % polymer with demineralized water and an aqueous solution of ammonium carbonate (1.7 wt % based on polymer weight). The application of vigorous stirring to this mixture caused the dispersion to coagulate. The separated polymer, after drying, was found to have a melt viscosity of $1.5 \times 10^3$ poise ($1.5 \times 10^2$ Pa·s). Even with this low melt viscosity, the release coating prepared and tested in accordance with Example 2 did not chalk, i.e., it passed the tape test.

Example 6

Improved results similar to Example 3 are obtained when the glutaric acid is replaced by 1.5 times its amount of methyl ethyl ketone.

Another unexpected benefit is realized by the present invention. The metal sheet from a coil, after coating with the coating composition and baked to form the non-chalking coating, may be overcoated with a polyethylene or polypropylene protective film having an adhesive surface, such as NITTO Polymask™ 30801, which protects the non-chalking coating during coil windup, handling and unwinding when ready for fabrication. The prior coating composition which chalked during fabrication also caused a problem in the peeling off of the protective film prior to fabrication. The removal tended to be non-smooth, i.e., jerky, and would leave defects and imprints of the film in the coating. Since the coating was a release coating, this effect was surprising and its cause unknown. Surprisingly, the special polymerization process used in the present invention, not only solves the chalking problem, but also solves the film removal problem. The removal becomes smooth and without film-caused defects in the coating.

What is claimed is:

1. In the process of fabricating articles from a substrate having a release coating comprising thermally stable essentially non-fluorocarbon polymer and low melt viscosity fluorocarbon polymer, said coating being from a liquid dispersion, said fluorocarbon polymer consisting essentially of tetrafluoroethylene and less than 0.5 mol % of comonomer, said low melt viscosity fluorocarbon polymer being made by aqueous dispersion polymerization in the presence of initiator, dispersing agent, and chain transfer agent, with said process of fabrication resulting in waxy buildup on the fabrication equipment, the improvement comprising carrying out the aqueous dispersion polymerization to produce said low melt viscosity fluorocarbon polymer in the presence of an effective amount of at least one water soluble additive selected from the group consisting of (i) hydrocarbon carboxylic acids and salts, esters, and peroxides thereof, (ii) alkanols and esters thereof, (iii) ketones, and (iv) fluorosurfactants which contain carbon-hydrogen bonding, said fluorosurfactant being perfluoroalkyl alkane sulfonic acid, the alkyl group containing 5 to 20 carbon atoms and the alkane group containing 1 to 4 carbon atoms, to eliminate the chalking of said coating, said low melt viscosity fluorocarbon polymer having a melting (peak) temperature of at least 315° C. and a melt viscosity of 50 Pa•s to 1×10$^5$ Pa•s at 372° C.

2. In the process of claim 1 wherein said additive is hydrocarbon carboxylic acids or peroxides thereof.

3. In the process of claim 1 wherein said substrate is a metal coil which is clean and free of primer.

4. In the process of claim 1 wherein said additive is disuccinic acid peroxide.

5. In the process of claim 1 wherein said additive is selected from the group consisting of propionic, malonic, succinic, adipic, citric, acetic, glutaric, formic, and hydroxyacetic acids and salts thereof.

6. In the process of claim 5, wherein said acid is succinic or glutaric acid or salt thereof.

7. In the process of claim 1 wherein said additive is an alkanol selected from the group consisting of methanol, ethanol, isopropanol, t-butanol, and 2,4-dimethyl-3-pentanol.

8. In the process of claim 1 wherein said alkanol is methanol or ethanol.

9. In the process of claim 1 wherein said additive is acetone or methyl ethyl ketone.

10. In the process of claim 1 wherein said fluorocarbon polymer is polytetrafluoroethylene.

11. A substrate coated with the improved release coating of claim 1.

12. The substrate of claim 11 wherein the proportion of the polymers with respect to one another range from 1:9 to 9:1 on a weight basis.

13. The substrate of claim 11 wherein said coating also contains pigment and filler.

14. In the process of claim 1, wherein said initiator is ammonium persulfate, inorganic persulfate, or potassium permanganate.

15. In the process of claim 1 wherein said surfactant is ammonium perfluorocarboxylate.

16. In the process of claim 1 wherein said chain transfer agent is non-polar.

17. Coating composition comprising organic liquid having dispersed therein thermally stable essentially non-fluorocarbon polymer and low melt viscosity tetrafluoroethylene polymer consisting essentially of tetrafluoroethylene and less than 0.5 mol % of comonomer, wherein said low melt viscosity tetrafluoroethylene polymer is made by aqueous dispersion polymerization in the presence of initiator, dispersing agent, chain transfer agent, and at least one water soluble additive selected from the group consisting of (i) hydrocarbon carboxylic acids and salts, esters, and peroxides thereof, (ii) alkanols and esters thereof, (iii) ketones, and (iv) fluorosurfactants which contain carbon-hydrogen bonding and which are perfluoroalkylalkane sulfonic acids, the alkyl group containing 5 to 20 carbon atoms and the alkane group containing 1 to 4 carbon atoms, said additive being present in an effective amount to provide a non-chalking coating on a substrate when said coating is formed from said coating composition and said substrate is thereafter fabricated, said low melt viscosity tetrafluoroethylene polymer having a melting (peak) temperature of at least 315° C. and a melt viscosity of 50 Pa•s to 1×10$^5$ Pa•s at 372° C.

18. The coating composition of claim 17 wherein said melt viscosity is 5×10$^2$ to 5×10$^4$ Pa•s at 372° C.

19. The coating composition of claim 17 dried and fused onto a substrate.

20. In the process comprising polymerizing tetrafluoroethylene in an aqueous medium in the presence of initiator, dispersing agent and chain transfer agent to form an aqueous dispersion of polytetrafluoroethylene homopolymer, the improvement comprising carrying out said polymerizing wherein said dispersing agent is fluorosurfactant which contains carbon-hydrogen bonding and which is perfluoroalkylalkane sulfonic acid, the alkyl group containing 5 to 20 carbon atoms and the alkane group containing 1 to 4 carbon atoms, to obtain said polytetrafluoroethylene homopolymer having a melting (peak) temperature of at least 315° C. and melt viscosity of 50 Pa•s to 1×10$^5$ Pa•s at 372° C.

* * * * *